United States Patent [19]

Poston

[11] Patent Number: 5,512,874
[45] Date of Patent: Apr. 30, 1996

[54] SECURITY DEVICE

[75] Inventor: Travis Poston, Herndon, Va.

[73] Assignees: T. B. Poston; N. E. Poston; A. T. Coudert; a part interest

[21] Appl. No.: 238,051

[22] Filed: May 4, 1994

[51] Int. Cl.⁶ .................................................. B60R 25/10
[52] U.S. Cl. .......................... 340/426; 340/539; 340/429; 340/665; 340/566; 200/52 A; 200/61.52; 200/61.45 R
[58] Field of Search ..................... 340/426, 539, 340/566, 665, 683, 689, 429, 440; 200/61.45 R, 61.45 M, 61.52, 52 A

[56] References Cited

U.S. PATENT DOCUMENTS

| | | | |
|---|---|---|---|
| 3,668,675 | 6/1972 | Joens et al. | 340/539 |
| 3,691,549 | 9/1972 | Wilson | 340/566 |
| 3,713,128 | 1/1973 | Wong et al. | 340/566 |
| 3,721,956 | 3/1973 | Hamann et al. | 340/65 |
| 3,858,131 | 12/1974 | Larsson | 335/136 |
| 3,864,675 | 2/1975 | Colibert | 340/224 |
| 4,013,995 | 3/1977 | Adamo | 340/65 |
| 4,134,109 | 1/1979 | McCormick et al. | 340/550 |
| 4,187,497 | 2/1980 | Howell et al. | 340/65 |
| 4,267,547 | 5/1981 | Sugiyama | 340/65 |
| 4,311,891 | 1/1982 | Faust | 200/61 |
| 4,358,750 | 11/1982 | Webster | 340/429 |
| 4,479,114 | 10/1984 | Yamamoto | 340/566 |
| 4,521,768 | 6/1985 | Haran et al. | 340/566 |
| 4,584,569 | 4/1986 | Lopez et al. | 340/566 |
| 4,972,713 | 11/1990 | Iwata | 73/517 |
| 4,982,684 | 1/1991 | Rubey | 116/203 |
| 5,117,220 | 5/1992 | Marino et al. | 340/550 |
| 5,185,593 | 2/1993 | DuRand, III et al. | 340/544 |
| 5,243,327 | 9/1993 | Bentz et al. | 340/566 |
| 5,258,743 | 11/1993 | Nelson et al. | 340/566 |

OTHER PUBLICATIONS

Two-page brochure of Intellitech Industries, Inc.–"Lookout Portable Security Systems" Jan. 1993.
Two-page brochure of Intellitech Industries, Inc.–"The Agent™" Jan. 1992.
Two-page brochure of Intellitech Industries, Inc.–"The Lookout Dispatcher"–Jul. 1992.

*Primary Examiner*—Donnie L. Crosland
*Attorney, Agent, or Firm*—Willian Brinks Hofer Gilson & Lione

[57]  ABSTRACT

A security device, intended for use as a temporary or permanent vehicle security device, having an intrusion detection device in the form of a pair of electrical contacts supported on a shock amplifying, rigid base and responsive to percussive-type forces for generating a detection signal. At least one of the electrical contacts is supported on a relatively stiff cantilevered arm which will not respond to small movements and vibrations, to thereby avoid generating frequent false alarms. Any contact closure signal from the electrical contacts is processed by a detection circuit which counts multiple contact closures and/or measures total closure time, thus ignoring signals generated from small forces or vibrations, thereby preventing against the source of most false alarms when generating a detection signal. The processing circuit preferably comprises a transmitter responsive to and incorporating the detection circuit and operable to transmit an intrusion signal to a remote receiver which is coupled to an alarm.

62 Claims, 5 Drawing Sheets

5,512,874

SECURITY DEVICE

FIELD OF THE INVENTION

The present invention relates to an alarm system for a vehicle, building or the like. More particularly, the present invention relates to an alarm system which is largely immune to false alarms and which will reliably detect attempted intrusions or violations of property. More specifically still, the invention relates to an alarm system which utilizes a shock or seismic sensor, coupled with false alarm resistant sensing circuitry.

BACKGROUND OF THE INVENTION

Most prior vehicle alarms are basically motion or acceleration sensors, vibration sensors, or both. See, for example, U.S. Pat. No. 4,817,497 to Howell, et al.; U.S. Pat. No. 4,479,114 to Yamamoto; U.S. Pat. No. 3,864,675 to Colibert; U.S. Pat. No. 4,013,995 to Adamo; U.S. Pat. No. 4,311,891 to Faust; U.S. Pat. No. 4,972,713 to Iwata; U.S. Pat. No. 3,721,756 to Hamann, et al.; and U.S. Pat. No. 3,858,131 to Larsson. Experience has shown that many such sensors are prone to false alarms when the sensor is set to detect small movements or ineffective when the sensor is set to only respond to a high threshold of motion. Most of these alarm systems employ, as the sensor mechanism, a moveable mass attached to an electrical device which produces a signal (by making an electrical contact) when the mass is moved sufficiently far from its equilibrium position. Most of these structures include a spring (or an element which functions as a spring and which holds the mass at, and which tends to restore the mass to, its equilibrium position. When the sensor mechanism is moved by a sufficiently large acceleration, a circuit is closed (or opened) and momentary electrical signal is generated (or a constant electrical signal interrupted), thus triggering an alarm.

Many of these alarm systems, for example Harmann, et al., Adamo, Howell, et al. and Yamamoto, use a latching circuit to trigger an alarm as soon as a single contact closure occurs. Such systems are especially prone to frequent false alarms as the contact closure is often the result of only a slight motion or vibration not caused by an intrusion or violation attempt.

An important consideration in the design of such prior art alarm systems is the tradeoff between sensitivity and false alarms. In the past, the designer frequently had to compromise between providing an alarm which was sufficiently sensitive to protect the vehicle (or structure) in question, while not responding to motions and vibrations, such as would be generated, for example, by innocent jostling of a vehicle, applying pressure on a bumper or fender or even high winds or heavy rains.

Portable alarms, i.e., alarms which are temporarily installed in a vehicle for security while it is parked, for example in or near a repair garage or truck depot, are known, for example, from U.S. Pat. No. 3,668,675 to Joens, et al. and U.S. Pat. No. 4,187,497 to Howell, et al. However, in practice, such "portable" alarms have proven cumbersome to use and ineffective in that, like the alarm systems discussed above, they relied either on contact closure latching circuits to sound an alarm, or vibration sensors which were too sensitive for practical use, in either case resulting in frequent false alarms and/or the need to reset the device each time it sounded an alarm. Moreover, many require that the contact arms be horizontally oriented, making them cumbersome to use for vehicles parked on non-level terrain.

Such cumbersome and false-alarm-prone devices are not suitable for effective theft and intrusion prevention by mechanic shops, service stations, fleet owners, e.g., rental companies and delivery companies, transit corporations, or the like, who frequently have a need to economically and efficiently secure and protect various different vehicles which may be parked in a high-risk situation, or which contain valuable cargo, e.g., vans, delivery trucks, repair trucks, etc. Additionally, none of the previous systems take advantage of the integral, time-limiting input circuitry required of many transmitters used in the security industry for monitoring non-latching contact sensors.

As used in this specification, the term "detection circuit" is used to refer to a circuit which recognizes a predetermined minimum number of switch contact closures within a predetermined time interval or a single switch contact closure event lasting at least a predetermined time interval.

OBJECTS OF THE INVENTION

It is accordingly an object of the present invention to provide a reliable security device which is not prone to false alarms and which is designed to be either permanently or temporarily installed in a vehicle.

It is a further object of the invention to provide a security device which utilizes stiff contact arms which will respond to a brief shock wave, such as would be generated by the closing of a door, breaking of a window, or jacking up of a vehicle, but which will not trigger false alarms in response to minor jostling of a vehicle, noise, wind, rain, etc.

It is a further object of the invention to provide a security device which uses a detection circuit which does not latch immediately upon the first sensor contact closure, but which is designed to recognize contact closures as being indicative of a valid alarm condition only if the contact closure is repeated a predetermined number of times in a predetermined time interval, or lasts for a predetermined time duration, i.e., consistent with an intrusion attempt, and to thereupon trigger an alarm signal or an alarm.

It is yet a further object of the invention to provide a security device which uses a detection circuit and a relatively stiff vibration-sensitive contact member to provide a dependable and reliable alarm, while avoiding frequent false alarms.

Additional objects, advantages and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

To achieve the foregoing, as well as other objects and advantages, and in accordance with the present invention, there is provided a security device comprising a pair of electrical contacts supported for example on a rigid base, at least one of the contacts being responsive to a percussive type force to generate a contact closure signal. The electrical contacts are part of a detection circuit which generates a detection signal if a predetermined number of contact closures occur within a predetermined time interval, or if a switch closure persists for a predetermined time duration. A transmitter, responsive to the detection signal, generates and transmits an intrusion signal, for example, to a remote receiver. Alternatively, the intrusion signal can be generated locally, immediately upon generation of the detection signal.

Preferably, the transmitter incorporates a detection circuit which is responsive to an electrical contact closure indicative of either (a) a predetermined number of contact closures within a predetermined time period, or (b) a total, i.e., integrated, contact closure time of at least some predetermined minimum value within a specified time period, or (c) both.

Preferably, at least one of the electrical contacts of the shock sensor is responsive to a percussive type force which accelerates the sensor by a minimum acceleration over a predetermined time period, for example, 1.6 G over a 16 milliseconds interval, but also responsive to a greater acceleration over a shorter time period, for example, 50 G in a 1 milliseconds interval. In general, the electrical contacts are designed to be responsive to an acceleration which will cause the switch to close multiple times as the contact opens and closes, in an oscillatory manner, at its resonant frequency or an acceleration sufficient to cause the electrical contacts to close and stay closed for a minimum time duration.

Preferably, at least one of the electrical contacts is supported on a cantilevered member of sufficient stiffness so as to only generate the detection signal in response to a percussive force which accelerates the sensor by at least a minimum acceleration within a specified time period, or a greater acceleration over a shorter time period.

Preferably, the remote receiver is used to drive an alarm device, such as an audible or visually apprehended alarm. Alternatively or additionally, the alarm device may comprise a means for retransmitting the intrusion signal to remotely located security personnel.

Moreover, the remote receiver may further comprise a computer interface for inputting the intrusion signal to a computer controlled vehicle identification system.

BRIEF DESCRIPTION OF THE DRAWINGS

The accompanying drawings, which are incorporated into and form a part of the specification, illustrate various embodiments of the present invention and, together with the description, serve to explain the principles of the invention. In the drawings.

DETAILED DESCRIPTION OF THE INVENTION

Figure 1A:
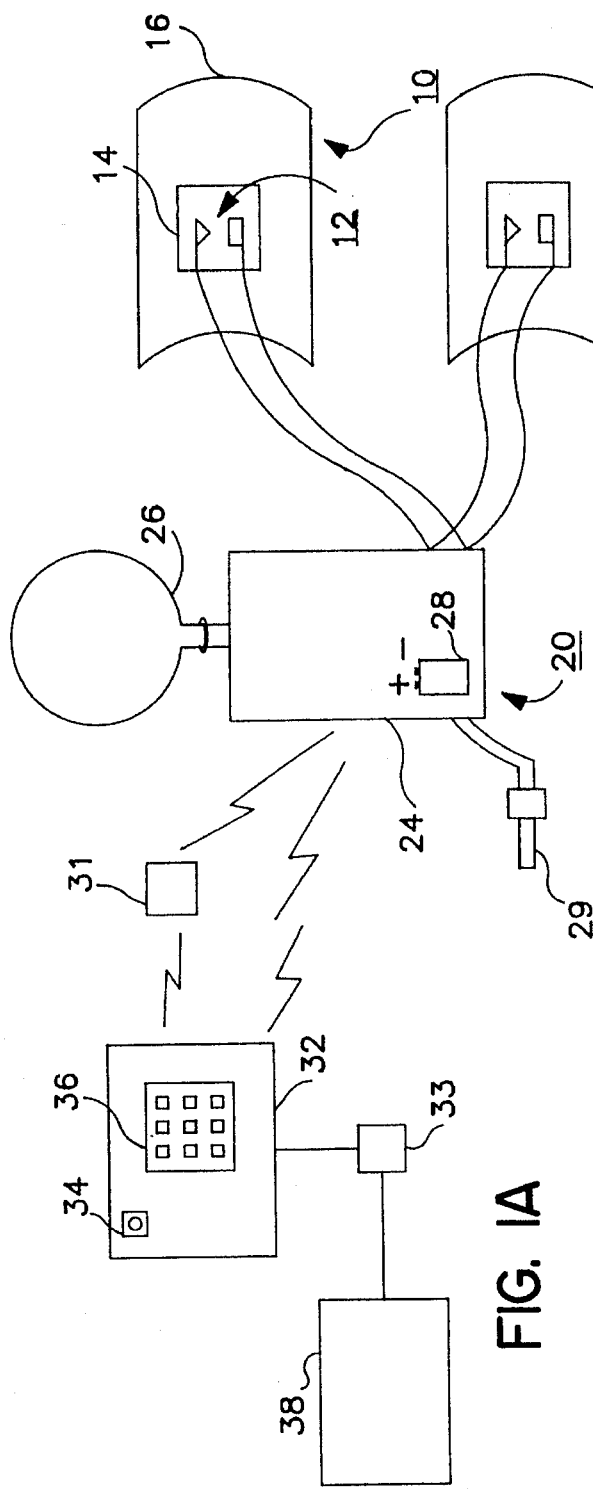
FIG. 1A is a schematic depiction of an example of an alarm system configuration according to the present invention, including a remote receiver coupled to a siren or strobe light, and/or to a burglar alarm.

Reference will now be made in detail to the presently preferred embodiments of the invention, examples of which are illustrated in the accompanying drawings. In the various figures, similar devices are labeled with common reference numerals.

Before describing the sensor and detection circuits, reference will be made to an exemplary alarm system consistent with the present invention. As illustrated in FIG. 1, the alarm system includes a sensor/detection section 10, a transmitter section 20 (which, as further explained below, may in practice either be separate from or integrally housed with the sensor/detection section 10), and a receiver/alarm section 30. The sensor/detection section 10 includes a shock sensor 12, such as an Ademco model 11, having normally open contact pieces (as further described below in connection with FIG. 3) which may be permanently affixed, for example, with epoxy, inside of a plastic housing 14. The housing is preferably supported on a rigid base 16. The base 16 is preferably formed from a piece of hard plastic or other material having good shock transmission characteristics so that it will respond to and transmit even small vibrations. The base should be wide enough to provide stability for the detector, but preferably as small as possible consistent with that function, and should be made of a material which will easily withstand the extremes of heat and cold which a car interior may experience. It is also advantageous for the base 16 to be shaped in the form of an arcuate surface to intensity its shock-amplifying ability.

When properly positioned on a part of the vehicle which is in contact with the vehicle frame, the base 16 acts in a manner analogous to a leaf spring transmitting shock waves to the shock sensor. The base 16 amplifies the shock or acceleration event to help ensure the sensor contact piece(s) respond to intruder-generated event.

Figure 2:
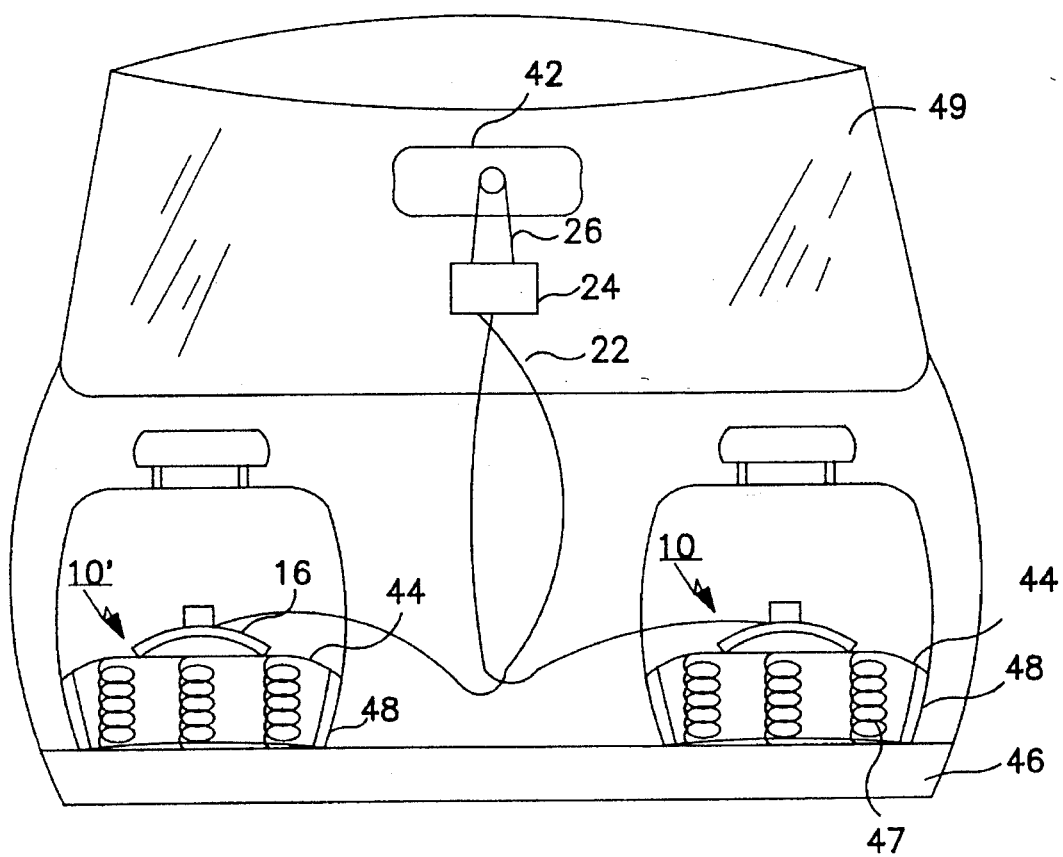
FIG. 2 is a schematic view of a vehicle depicting one example of an installation of a typical alarm system according to the present invention.

Such a mechanical sensor is reliably responsive to percussive type shock waves, and can be quickly and easily adjusted to only react to shock waves, such as those emanating from the frame of the vehicle, as would be produced by breaking a window, or due to jacking up the vehicle (i.e., to remove the tires or other valuable parts) or due to forcing a door open. These types of blows to a vehicle are strong enough to produce a shock effect on the frame of the vehicle, typically an initially strong but brief shock wave, which will radiate from the frame upward into the seat of a vehicle. It has been found that the seat frame and springs form an especially good platform for sensing such vibrations and, preferably, as shown in FIG. 2, two sensors, 10 and 10', may be positioned, one on each of the front seats, to increase the vehicle's security. The sensors 10 and 10' are preferably connected to a single transmitter 20. As will be understood by the artisans, mechanical-type shock (or seismic) sensors, other than the Ademco model 11, may be used as the detector.

Preferably, the shock sensor/detector(s) may be hard-wired, e.g., by wires 22, to a security RF transmitter 24, such as the Ademco model 5715 universal transmitter, which, in order to maximize transmission range, may be positioned near a window of the vehicle to be protected. For some transmitter designs, an optimum antenna radiation pattern may be obtained when the transmitter is hanging from the rear view mirror by means of a strap 26, although other designs, wherein the antenna is positioned within the housing 14, or where the antenna is formed within the rear view mirror, are also within the scope of the invention. Such burglar alarm transmitters typically are powered by a 9VDC battery, have a transmit LED and, depending upon the transmitting power, have a free space range of approximately 200 to 3,500 feet. As will be understood by the artisan, other transmitters can also be used as long as it is designed to only recognize several switch closures occurring in a short time period or a single, long closure, thus protecting against the most frequent cause of false alarms.

Figure 3:
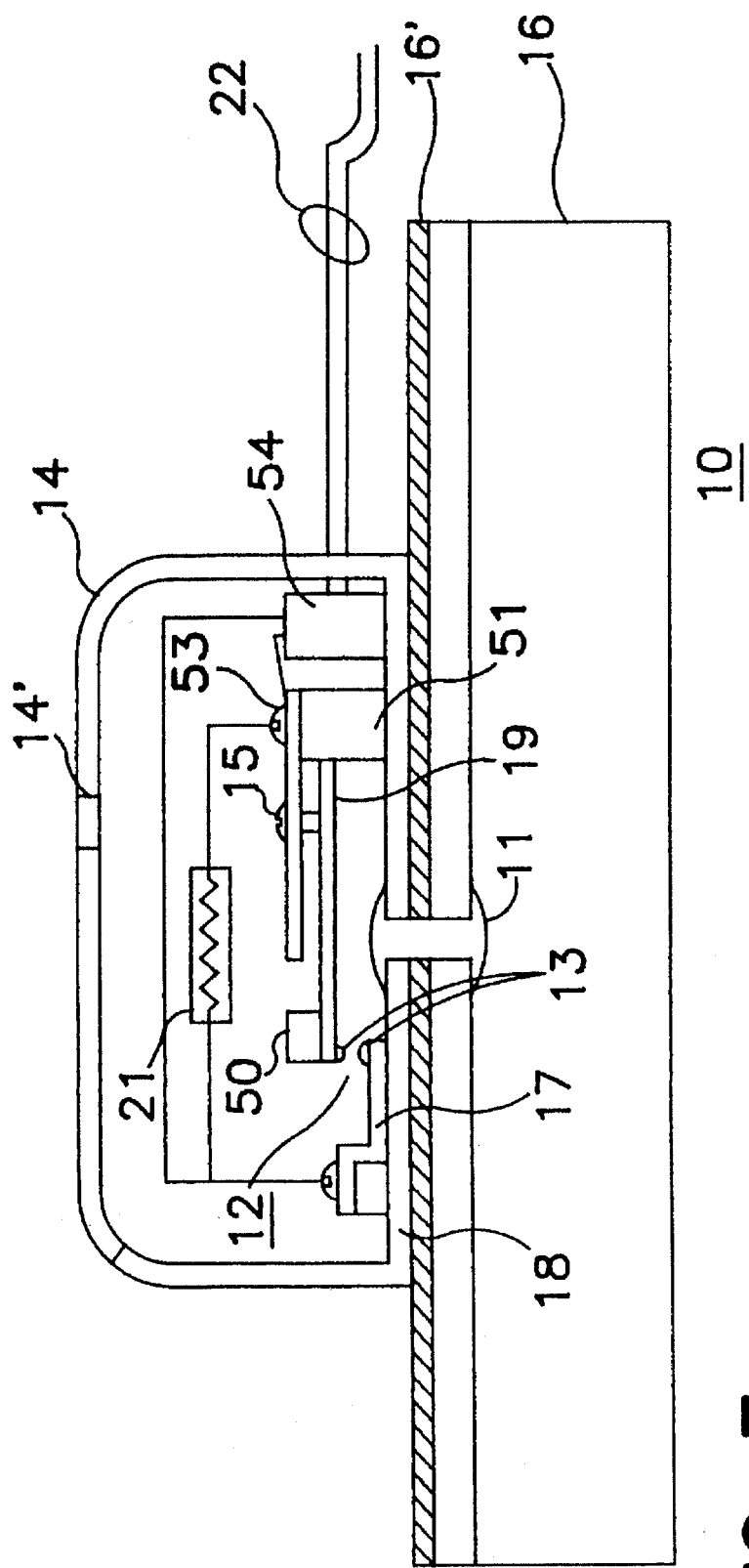
FIG. 3 is an elevation section view of a shock sensor depicting the contact terminals and optional tamper resistor.

As best seen in FIG. 3, the sensor/detector housing may further include a base 18, riveted by means of rivets 11 to the rigid (preferably plastic) base 16. As will be apparent from the discussion which follows, for some installations it is also preferable for the base to have a metallic coating 16' to serve as a ground plane for a transmitting antenna which may be located in the housing 14. The normally open contacts 12 typically include contact terminals 13, which are hard-wired to the input of the transmitter 24. A contact adjustment screw 15 may be provided so that the contact arms 17 and 19 can first be adjusted, via an access hole 14', to barely touch each other; then the adjustment screw 15 is turned in the opposite direction a small amount, e.g., a ⅛th turn, so that the contacts are slightly separated. Preferably, at least one of the contact arms (in the illustrated embodiment the arm 19) is a cantilever arm supported on a post 51 which is secured to the base 18. In the manner known to those of skill in the art, the cantilever arm is typically provided with a small, vibration-responsive mass 50.

Optionally, a tamper detecting resistor 21, e.g., 2.2K ohm, from Inovonics Corporation, may be connected in parallel with the contacts 17 and 19. This configuration presents a fixed-value, tamper-proof, parallel circuit between the input circuit of the transmitter 24 and the contacts 12. Optionally, the housing of both the transmitter 24 and shock detector housing 14 can also be provided with a tamper detection circuit. Conveniently, the optional resistor and wires 22 may be electrically connected to the contact pieces 13 via the contact arms 17 and 19 and the post screws 52 and 53, respectively. The detection circuit may comprise one or more PCBs or the like 54 housed within the sensor/detector housing 14. The PCBs may, as alluded to above, also include the transmitter.

Alternatively, as alluded to above and as best seen in FIG. 2, the transmitter 24 may be installed in the vehicle by means of a hanging strap 26, which may be placed around/over a rear view mirror 42 of a vehicle 40 in order to suspend the transmitter adjacent the window 49. Thus, orientation is not critical. The invention will also work well using the ground plane antenna 16' described above with the transmitter housed in the detector housing 14 or other variant forms, such as where the rear view mirror is formed with an antenna built into it. As will be apparent to the artisan, any convenient way of mounting the transmitter 24 and its associated antenna may be used. As explained above, for vehicle installations, the shock detector(s) 10 and 10' are preferably placed on the seat(s) 44 of the vehicle 40 in order to take advantage of the mechanical amplification effect of the seat frame 48 and seat springs 47, which are mechanically connected to the vehicle frame 46. The installation is now complete.

When used with a detection circuit as described below, a sensor/detector constructed and positioned as described above will have ample sensitivity to protect the vehicle from unwanted intrusions, yet is almost false-alarm proof. The sensor 10 is self-resetting because any oscillations produced in the mass and spring attached to the contact element by the large but brief intruder-generated shock wave quickly dampen out, i.e., in a fraction of a second, to the point it will no longer be of sufficient amplitude to close the sensor contacts 12. Slower motions and vibrations, such as would be generated by innocent jostling of the vehicle, pressure on the bumper, loud noise-induced vibrations, or even high winds and heavy rain, do not affect the frame of the vehicle sufficiently to produce enough acceleration of the sensor to cause either a single, long-duration contact closure or the necessary multiple contact closures within the specified time interval.

However, in the event that such a disturbance does create shock waves of sufficient strength to produce at least a single contact closure, the detection circuit avoids generation of a false alarm, as such disturbances will not cause the predetermined number of switch closures within the predetermined time or a single closure of sufficiently long duration to be recognized as an intruder or violator-generated event.

Figure 4:
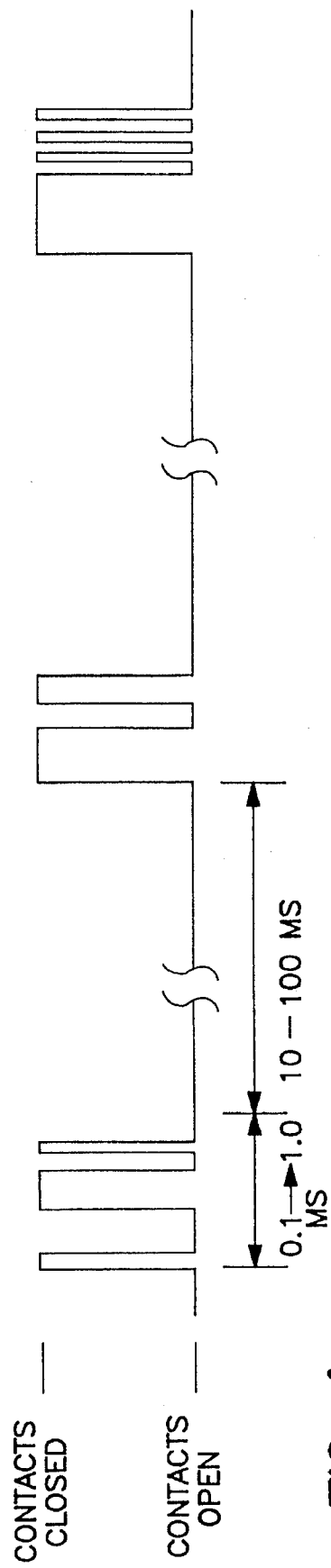
FIG. 4 is a time graph of a typical shock sensor contact closure pattern.

Experiments using an Ademco model 11 shock sensor have shown that, as compared to lesser shock waves, larger shock waves cause the mass and spring in the shock sensor to vibrate for a longer time, and cause more momentary switch closures. Moreover, as depicted in FIG. 4, these switch closures have been found to consist of sets or "bursts" typically comprising 2–4 brief closures (there can be more), each of randomly variable duration, but with the total burst occurring over a time interval of less than about 1 millisecond. These bursts are in turn separated by a longer interval, often lasting tens of milliseconds. The above-noted experiments indicate that the switch closures occur in bursts lasting from about 0.1 milliseconds to about 1.0 milliseconds, and more typically from about 0.4 milliseconds to about 0.8 milliseconds, and are separated by quiescent intervals which can, depending on the shock sensor, range from about 10 milliseconds to 100 milliseconds, but which, in the case of the Ademco model 11, is typically about 33 milliseconds. The quiescent time interval generally corresponds to the period of resonant oscillation of the total mass carried by and spring constant of the leaf spring used in the shock sensor. As will be apparent to the artisan, the duration of a burst and the duration of the interval between bursts may vary depending upon the particulars of the shock sensor used. The total oscillation time of the spring and mass can be determined by the relationship $$T = 2\pi \sqrt{\frac{m}{k}} \qquad (1)$$

where:

T is the period of resonance m is the total mass k is the spring constant

However, it has been observed that the bursts are caused by switch bounce during the time that the vibrating mass on the spring pushes the switch contacts into closure.

As will be apparent to the artisan upon reading the above, a similar result would be obtained in the event a dual contact pendulum, such as that depicted in Jones, et al., were used, although the burst patterns might be expected to differ depending on which of the stationary contact elements the electrical contacts on the cantilever arm was contacting. For piezoelectric sensors (where the "arm" can be considered to oscillate as a very stiff cantilever with a lot of damping) yet a different burst and quiescent characteristic may be expected. For each sensor, an appropriate detection circuit must be designed with the sensor closure characteristics in mind. For a given shock sensor, the effective sensitivity of the alarm system can be adjusted both electronically, by the detection circuit (described below), and mechanically, for example by adjustment of the contact adjustment screw 15 of FIG. 3, as described above.

It has been found that there is a distinct correlation between the magnitude of the shock delivered to the sensor and the number of bursts generated by the event. However, the number of bursts required to indicate contact not only depends on the magnitude of the delivered shock, it depends on the sensor characteristics as well. When using an Ademco model 11 shock sensor, it has been found that at least two bursts are required to reliably indicate an intrusion event.

The characteristics of a shock required to close the shock sensor contacts of course depends on the nature of the applied force (e.g., a rectangular pulse, sinusoid, etc.), its magnitude and duration.

For example, a uniform acceleration (rectangular pulse or "impulse") must have a minimum acceleration of roughly 1.5 G, or the contacts (assumed to be 0.5 mm apart initially) of an Ademco model 11 sensor will not close. This minimum acceleration would have to last at least half a resonant period as given by (1) above, or about 16 milliseconds for the Ademco model 11.

However, a rectangular pulse of higher acceleration than 1.5 G need not last as long as milliseconds. The contacts (of nominal spacing d) will close at least once, provided the acceleration lasts at least $$\Delta t = \frac{T}{2\pi} \cos^{-1}\left[1 - \frac{kd}{ma}\right] \quad (2)$$

Depending upon the characteristics of the incident shock and specific shock sensor characteristics, the relationship between the magnitude and durations can be similarly ascertained by one of ordinary skill in the art.

Figure 5C:
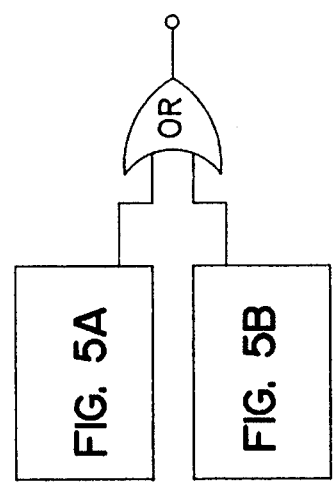
FIGS. 5C and 5D are schematic illustrations of embodiments which combine the recognition circuits of FIGS. 5A and 5B.
Figure 5D:
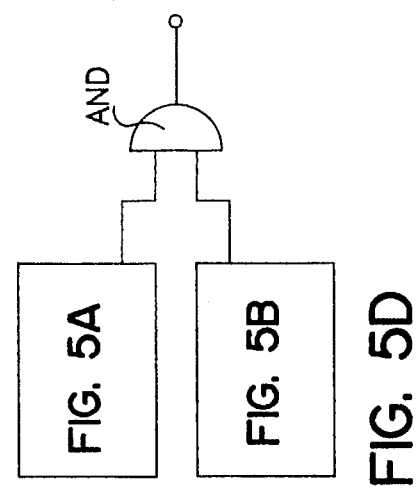
Figure 5A:
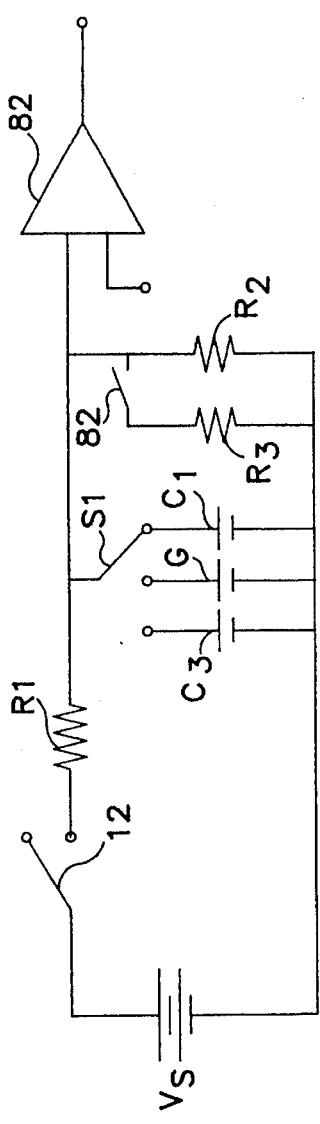
FIGS. 5A and 5B are schematics of exemplary detection circuits according to the present invention.

FIG. 5A depicts a simple, exemplary form of detection circuit using an RC circuit consisting of resistor R1 and capacitor C1 in series with a DC power source Vs and the sensor contacts 12. A comparator 82, or other equivalent level-sensitive element, has an input connected across the capacitor C1. In the embodiment illustrated, the capacitor only charges during the time that the sensor contacts are actually closed, with a time constant determined by the value of resistor R1 and capacitor C1. Alternatively, the circuit can be configured using a normally charged capacitor which discharges during shock sensor contact closure.

As alluded to above, a selector switch S1 or the like may be used to switch capacitors C2 or C3, of different values from capacitor C1 into the RC circuit, thereby adjusting the RC charging time constant and varying the sensitivity of the alarm system. As will be recognized by the artisan, an arbitrary number of capacitor values may be used, or the capacitance may be varied by switching capacitors in or out of the charging circuit, e.g., in series with or parallel to the capacitor C1. Substituting larger capacitors for capacitor C1 increases the time constant, requiring more switch closures to charge the capacitor to a sufficient voltage to "trip" the level-sensitive element 82. In this way, the circuit can be set to respond only to large shocks that produce more switch closures or to a single, large shock which creates a closure of long duration. As an alternative to varying the capacitance of the RC circuit, the time constant can be varied by varying the value of the resistance in the RC circuit.

In the illustrated embodiment where a contact closure event causes the capacitor C1 to charge, a discharge resistor R2 is preferably connected across capacitor C1. The resistor R2 has a resistance which is much larger than that of resistor R1, and provides a discharge path for the capacitor C1 to discharge over a period of several (i.e., on the order of about 1–4) seconds, assuming no significant additional contact closures are experienced, whereby the circuit resets itself to be ready to recognize another shock wave. Resistor R2 need not be an explicit component, but may instead represent leakage current in the level-sensitive element 82 that can discharge capacitor C1. The resistance in the discharge path should be sufficiently large to "hold" the voltage on capacitor C1 during a quiescent event (e.g., to about 90% of the voltage impressed on it by the contact closures) but not so large as to make the reset time unduly large. As should now be understood by the artisan, in the embodiment where the timing capacitor is normally charged, a relatively large charging resistance is used which slightly "charges" the capacitor during the quiescent period between discharges caused by contact closures.

As will be appreciated by the artisan from the above, many variations of this circuit are possible. For example, for effecting a fast reset after a single, large shock wave, or if no second pulse burst is received (e.g., within 100 milliseconds of a first pulse burst), a small discharge resistance, R3, can be switched into the circuit, for example, by a switch S2.

Figure 5B:
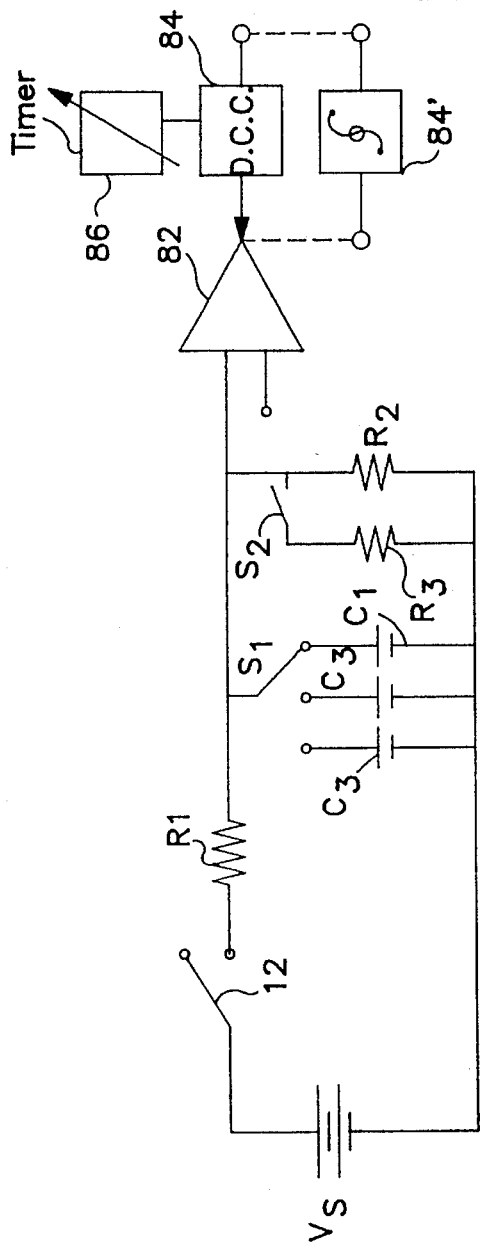

FIG. 5B illustrates another embodiment of a detection circuit, which counts contact closure "bursts" from the shock sensor. As in FIG. 5A, an RC circuit consisting of resistor R1 and capacitor C1 are connected in series with the sensor switch 12 and a DC source Vs. However, in this embodiment, the time constant defined by $R_1 C_1$ is much shorter than that of in FIG. 5A (for the Ademco model 11 shock sensor, an RC time constant of about 0.22 milliseconds has been found to generate good results), as the RC circuit is used for wave shaping in the time frame of interest (e.g., on the order of tenths of a millisecond for an Ademco model 11), and not primarily for integration, except as R1 and C1 may act to integrate or smooth out any very minor and/or momentary contact events, for example, small transients that may immediately precede or follow a contact closure event. Also, as in FIG. 5A, a level-sensitive element 82 triggers when capacitor C1 charges to a sufficient voltage, and a resistor or leakage element R2 may be used to discharge the capacitor C1 between contact closures. The discharge resistor should be about on the order of magnitude larger than the resistance R1. For the Ademco model 11, a discharge time constant of about 2.2 milliseconds has been found to produce good results. The charging and discharging time constants, and comparator triggering level are chosen to produce a single pulse at the output of the level-sensitive element 82 for every contact closure "burst", in other words integrating the random pulses which comprise a burst into a single pulse. The resulting pulse is squared off by the comparator 82 and the number of such pulses are then counted by a digital counting circuit 84 that triggers the transmitter only if a predetermined number of contact closure "bursts" occurs within a predetermined time duration as provided by a variable timer 86 which operates to set/reset the counter. Increasing or decreasing the required number of contact closure events within the time frame established by the set (S) and reset (R) terminals of the counter reduces or increases, respectively, the sensitivity of the system, by requiring larger shocks to trigger an alarm. Alternatively, lengthening or shortening the time period to achieve a preset count will serve to respectively increase or decrease the sensitivity of the system.

As another alternative, an integrator 84', for example, a simple RC integration network, can be used in lieu of a digital pulse counter to "sum" the total pulses output from the comparator 82.

Also, as illustrated in FIG. 5C, for extra security, the detection circuits of FIGS. 5A and 5B can be used in parallel, and passed through an OR gate or equivalent, whereby an output from either recognition circuit will generate a detection signal. Alternatively, as illustrated in FIG. 5D, where extreme false alarm protection is required, the circuits of FIGS. 5A and 5B can be operated in parallel, and their outputs input to an AND gate, or the like. In that case, only when the output of both circuits (FIGS. 5A and 5B) are high, will a detection signal be generated by the AND gate.

In terms of equivalent integration time constants for use with the Ademco model 11 sensor, a relatively fast charging (or discharging—in the case of a normally charged capacitor C1) time constant is required so that the capacitor C1 will charge to the voltage needed to trigger the comparator 82 after contact events. If the required trigger voltage is ⅔ of the battery voltage, Vs, and $t_{on}$ is the average amount of "on" time for the sensor contacts during a contact event, then the appropriate time constant $\tau_f$ is:

$$\tau_f = N \cdot \left( \frac{t_{on}}{-\ln\left(1 - \frac{2}{3}\right)} \right) \quad (3)$$

Assuming N=2, and the average "on" time during a contact event is 0.25 milliseconds, then $\tau_f$= 0.44 milliseconds.

During the T–33 millisecond period between "contact events," the capacitor C1 in FIG. 5B steadily discharges due to resistor R2. As alluded to above, this discharge should be limited to about 10% drop during the time 33 milliseconds quiescent time. In other words, the "slow" discharge time constant should be $$\tau_s = -\frac{T}{\ln(0.9)} = 313 \text{ msec for } T = 33 \text{ msec} \quad (4)$$

If it is desired to integrate longer, i.e., to require more "contact events" to trigger a valid alarm, the "fast" time constant $\tau_f$ (as per equation (3)) must be lengthened. If a shock sensor having a longer resonant period T is used, the slow time constant $\tau_s$ must be lengthened according to equation (4).

Extensive testing has established that the contact sensor detection circuit works well on a wide variety of vehicles and other security applications. However, if necessary, minor adjustments may be quickly and easily performed by means of the adjustment screw 15, whereby the contacts 12 may be positioned further apart for less sensitivity, or slightly closer together for increased sensitivity or by means of the RC time constant setting switch S1, the counter count set, or the timer 84.

As alluded to above, for vehicle protection, the best protection is realized when multiple detectors are used, one for each side of the vehicle. For a four-door vehicle, maximum protection is realized if a shock detector is positioned on each seat. In case a van or truck is to be protected, a shock detector should be positioned in the cargo bay with the rigid base 16 in firm contact with the hard floor of the van/truck.

Referring back to FIG. 1, the system may be armed either by means of a simple on/off switch 34 or keypad 36 on remote receiver 32. The remote receiver 32 may comprise a receiver, such as the model 4280 by Ademco, which will particularly work well with Ademco burglar alarm panels. Alternatively, slave-type receivers offered by other burglar alarm manufacturers, such as the Inovonics Corporation model C-403 Super Serial Receiver with an RS-232 compatible serial interface for connection to a computer, may be used. The remote receiver location is where the controls for the system are operated, and may include an alarm 38, such as a sounding device or a strobe light. Further, as detailed below, the receiver output can be integrated into a standard home or office security system, which can be configured to alert the police or a private security central station. Alternatively, the receiver/on-off switch/sounding device/strobe light can be a stand-alone system; the latter being a very economical, nearly false-alarm-proof vehicle protection for individuals who may have to park their cars in unprotected, high-crime areas. The remote receiver can also be in the form of a beeper or pager, so as to alert the person carrying the beeper or pager of an intrusion attempt. Thus, the receiver (and therefore the system) can be made completely mobile.

Figure 1B:
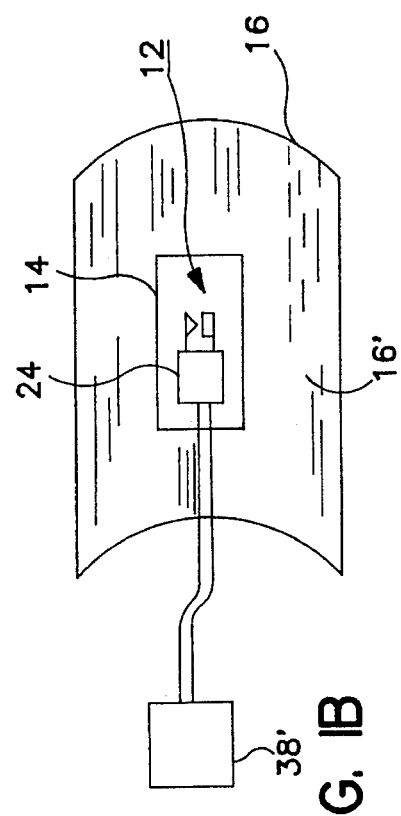
FIG. 1B is a schematic depiction of the detector and transmitter section of the system of FIG. 1A, wherein the detector and transmitter are commonly housed, and including an optional local hard-wired siren, strobe light and/or burglar alarm.

Alternatively, the shock wave detector may be combined inside the same housing with a low-power, e.g., fractional to one watt, transmitter, which would send alarm signals to a transceiver, which in turn would transmit alarm signals to a remote receiver. For example, as illustrated in FIG. 1B, the transmitter, detection circuit and shock sensor may be combined inside the sensor/detector housing 14 having a base 16 coated with a metallic layer to serve as a ground plane for a transmitting antenna. In this embodiment, the transmitter may be used to activate a remote alarm device 38, as illustrated in FIG. 1, and/or may (also) be used to activate a hard-wired local alarm, such as a light, siren, or other alarm 38', as illustrated in FIG. 1B.

In some situations, a multi-watt transmitter, i.e., a transmitter having a range of several miles or more is needed, for example, to directly alert the local police or remote security personnel. In such situations, the system is preferably powered directly from the vehicle battery, for example, through the vehicle cigarette lighter via adaptor 29, or by means of an under-dashboard connection. Where a low (e.g., fractional to one watt) transmitter is desired, a standard electronics battery (preferably rechargeable) can be used. As will be understood by the artisan, any system tied into the vehicle's electrical system may be permanently installed in the vehicle.

Once the system is armed at the location of the receiver 32 (home or office), the vehicle is protected from unwanted intrusions. As will now be understood by the artisan, the alarm may be arranged to sound inside the vehicle owner's home or vehicle custodian's office, not in a distant parking lot where false alarms generated by prior art alarms are so frequent that passers-by typically ignore them. Moreover, if the user of the alarm system according to the present invention has a security system in his/her home or office, the vehicle alarm system can be integrated into that system, can function as a stand-alone alarm system, or both so that the user is provided with an alarm capable of being professionally monitored, regardless of whether the vehicle owner or custodian is physically present.

The transmitter can operate as a narrow band FM or spread-spectrum transmitter on an FCC-licensed frequency, and should be capable of transmitting on the order of about 2400–4800 baud. The transmitter may also be remotely activated, for example, by a remote control device.

The foregoing description of a preferred embodiment of the invention has been presented for purposes of illustration and description. It is not intended to be exhaustive or to limit the invention to the precise form disclosed, and obviously many modifications and variations are possible in light of the above teaching. For example, a voice siren or other audible or visual alarm, located at the vehicle in question, can be included, and for battery-powered systems, a low battery level indicator can be included. Also, with only minor modification, a security device according to the present invention may be adapted for use to secure a building, room, entry way, or the like, using either the building power supply, if any, or a battery-power supply, which is especially advantageous for temporary installations, for example, in storage sheds, or the like, or where no local power supply is available. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A security device comprising:
   a shock impulse sensor comprising a pair of electrical contacts, at least one of said contacts being responsive to a percussive force of a predetermined minimum acceleration to cause said contacts to close;
   a detection circuit responsive to a predetermined minimum number of contact closures per percussive shock impulse event within a predetermined time period for generating a detection signal;
   a transmitter, responsive to said detection signal for transmitting an intrusion signal; and
   a remote receiver for receiving said intrusion signal.

2. The security device according to claim 1, wherein said at least one contact comprises a resilient cantilevered member having an electrical contact member thereon, wherein the cantilevered member is of sufficient stiffness and has sufficient associated mass and is held at a sufficient distance (d) from the other of said contacts so as to only close in response to a percussive force greater than a predetermined minimum force.

3. The security device according to claim 2, wherein the percussive force is at least sufficient to accelerate said contact member by 1.6 G over a 16 millisecond period.

4. The security device according to claim 2, wherein the percussive force is at least sufficient to accelerate said contact member by 50 G over a 1 millisecond period.

5. The security device according to claim 2, wherein the magnitude of the predetermined minimum force varies inversely with its time duration.

6. The security device according to claim 2, wherein said at least one contact further comprises a mass carried on said resilient cantilevered member.

7. The security device according to claim 2, wherein said electrical contacts are encased in a housing and supported on a rigid base, said housing being affixed to said rigid base whereby any percussive force reaching said rigid base is transmitted to said cantilevered member.

8. The security device according to claim 7, wherein said rigid base is formed in an arcuate surface for amplifying said percussive force.

9. The security device according to claim 1, further comprising a tamper sensing means for detecting tampering with said electrical contacts.

10. The security device according to claim 9, wherein said tamper sensing means comprises an electrical resistance, connected in parallel across said electrical contacts.

11. The security device according to claim 1, wherein said detection circuit is hard wired to said transmitter.

12. The security device according to claim 1, wherein said transmitter, detection circuit and electrical contacts are contained within a common housing.

13. The security device according to claim 11, wherein said security device is a vehicle security device, and wherein said transmitter further includes positioning means for positioning the transmitter at a location for optimizing transmission of said intrusion signal.

14. The security device according to claim 13, wherein said positioning means comprises a strap for positioning said transmitter adjacent to a window of a vehicle to be secured.

15. The security device according to claim 2, wherein said shock sensor generates a damped, repetitive contact closure signal upon closure of said contacts, said contact closure signal having a characteristic period of oscillation including a characteristic first portion indicative of a contact closure interval and a second characteristic portion indicative of a contact open interval.

16. The security device according to claim 15, wherein said contact closure signal comprises a generally damped oscillatory signal having a period T defined by $$T = 2\pi \sqrt{\frac{m}{k}}$$

where:
   m is said associated mass; and
   k is said spring constant.

17. The security device according to claim 16, wherein said percussive force occurs over a time interval $\Delta t$ defined by:

$$\Delta t = \frac{T}{2\pi} \cos^{-1}\left[1 - \frac{kd}{ma}\right]$$

where:
   a is the acceleration imparted by the percussive force.

18. The security device according to claim 1, wherein said detection circuit is responsive to at least two contact closures in a predetermined time interval for generating said detection signal.

19. The security device according to claim 1, wherein said detection circuit is only responsive to total contact closure times of at least a minimum predetermined value for generating said detection signal.

20. The security device according to claim 1, wherein said detection circuit further comprises a comparator, for comparing a voltage proportional to the total contact closure time of said electrical contacts with a reference value, and for outputting said detection signal when said voltage exceeds said reference value.

21. The security device according to claim 20, wherein said detection circuit further comprises an RC network for generating said voltage proportional to total contact closure time.

22. The security device according to claim 21 wherein said detection circuit includes a first time constant $\tau_f$ for detecting contact closure, defined by:

$$\tau_f = N \cdot \left(\frac{t_{on}}{-\ln(1-A)}\right)$$

where:
   N=minimum number of contact closures for generating a detection signal;
   $\tau_{on}$=duration of a contact closure;
   A=a number (less than 1) indicative of the proportion of the charging voltage $V_s$ used to define a closure event.

23. The security device according to claim 21, wherein said RC network has a variable time constant.

24. The security device according to claim 20, further comprising means for determining the number of detection signals generated.

25. The security device according to claim 24, wherein said determining means comprises a counter.

26. The security device according to claim 25, further comprising a timer for resetting said counter after a predetermined time interval.

27. The security device according to claim 24, wherein said determining means comprises an integrator.

28. The security device according to claim 1, wherein said transmitter is powered by an internal battery.

29. The security device according to claim 1, wherein said security device is a vehicle security device and said transmitter is powered by a battery of said vehicle.

30. The security device according to claim 1, further comprising a transceiver for receiving said intrusion signal and retransmitting it to said remote receiver.

31. The security device according to claim 1, further comprising an alarm device responsive to an intrusion signal from said receiver.

32. The security device according to claim 31, wherein said alarm device comprises a visual alarm.

33. The security device according to claim 31, wherein said alarm device comprises an audio alarm.

34. The security device according to claim 31, wherein said alarm device comprises means for retransmitting said intrusion signal to remotely located security personnel.

35. A security device comprising:
- a shock impulse sensor comprising a pair of electrical contacts supported on a rigid base, said electrical contacts including at least one cantilevered arm supporting an electrical contact piece, said arm being sufficiently rigid whereby it will only respond to percussive forces above a predetermined acceleration applied within a minimum time for generating a contact closure signal;
- a detection circuit responsive to said contact closure signal having either a minimum predetermined number of contact closures per percussive shock impulse event within a first predetermined time duration, or a predetermined minimum total contact closure time per percussive shock impulse event within a second predetermined time period for generating a detection signal;
- an alarm means responsive to said detection signal for generating an alarm.

36. The security device according to claim 35, further comprising a transmitter operable to generate an intrusion signal in response to said detection signal and a remote receiver for receiving said intrusion signal.

37. The security device according to claim 35, wherein said alarm means comprises a local alarm positioned in the vicinity of said shock sensor.

38. The security device according to claim 37, further comprising a transmitter operatively connected to said detection circuit, and operable to generate an intrusion signal in response to said detection signal, and a remote receiver for receiving said intrusion signal, and wherein said alarm means further comprises an alarm responsive to said remote receiver for generating an alarm in response to said intrusion signal.

39. The security device according to claim 36, wherein said alarm means comprises an alarm responsive to said remote receiver for generating an alarm in response to said intrusion signal.

40. The security device according to claim 35, wherein the percussive force is at least sufficient to accelerate said contact member by 1.6 G over a 16 millisecond period.

41. The security device according to claim 35, wherein the percussive force is at least sufficient to accelerate said contact member by 50 G over a 1 millisecond period.

42. The security device according to claim 35, wherein the magnitude of the predetermined minimum force varies inversely with its time duration.

43. The security device according to claim 35, wherein said electrical contacts are encased in a housing, said housing being affixed to said rigid base whereby any percussive force reaching said rigid base is transmitted to said cantilevered member.

44. The security device according to claim 43, wherein said rigid base is formed in an arcuate surface for amplifying said percussive force.

45. The security device according to claim 35, further comprising a tamper sensing means for detecting tampering with said electrical contacts.

46. The security device according to claim 35, wherein said shock sensor generates a damped, repetitive contact closure signal upon closure of said contacts, said contact closure signal having a characteristic period of oscillation including a characteristic first portion indicative of a contact closure interval and a second characteristic portion indicative of a contact open interval.

47. The security device according to claim 46, wherein said contact closure signal comprises a generally damped oscillatory signal having a period T defined by $$T = 2\pi \sqrt{\frac{m}{k}}$$

where:
- m is said associated mass; and
- k is said spring constant.

48. The security device according to claim 47, wherein said percussive force occurs over a time interval $\Delta t$ defined by:

$$\Delta t = \frac{T}{2\pi} \cos^{-1}\left[1 - \frac{kd}{ma}\right]$$

where:
- d is the nominal spacing between said contacts
- a is the acceleration imparted by the percussive force.

49. The security device according to claim 35, wherein said detection circuit is responsive to at least two contact closures in a predetermined time interval for generating said detection signal.

50. The security device according to claim 35, wherein said detection circuit is responsive to a total contact closure times of at least a minimum predetermined value for generating said detection signal.

51. The security device according to claim 35, wherein said detection circuit further comprises a comparator, for comparing a voltage proportional to the total contact closure time of said electrical contacts with a reference value, and for outputting said detection signal when said voltage exceeds said reference value.

52. The security device according to claim 51, wherein said detection circuit further comprises an RC network for generating said voltage proportional to total contact closure time.

53. The security device according to claim 52 wherein said detection circuit includes a first time constant $\tau_f$ for detecting contact closure, defined by:

$$\tau_f = N \cdot \left(\frac{t_{on}}{-\ln(1-A)}\right)$$

where:
- N=minimum number of contact closures for generating a detection signal;
- $t_{on}$=duration of a contact closure;

A=a number (less than 1) indicative of the proportion of the charging voltage $V_s$ used to define a closure event.

54. The security device according to claim 53, wherein said RC network has a variable time constant.

55. The security device according to claim 51, further comprising means for determining the number of detection signals generated.

56. The security device according to claim 55, wherein said determining means comprises a counter.

57. The security device according to claim 56, further comprising a timer for resetting said counter after a predetermined time interval.

58. The security device according to claim 55, wherein said determining means comprises an integrator.

59. The security device according to claim 36, wherein said transmitter is a fractional watt transmitter powered by an internal battery.

60. The security device according to claim 36, wherein said security device is a vehicle security device and said transmitter is powered by a battery of said vehicle.

61. A security device for generating a detection signal for detecting attempted intrusions while minimizing false alarms, comprising:

a shock sensor comprising a pair of electrical contacts, at least one of said contacts being responsive to an impulsive percussive force of a predetermined minimum acceleration to cause said contacts to close;

a detection circuit responsive to a predetermined minimum number of contact closures per impulsive percussive force event within a predetermined time period whereby said detection signal, indicative of an intrusion attempt, is generated.

62. A method of generating a detection signal for detecting attempted intrusions while minimizing false alarm signals comprising the steps of:

sensing, using momentum transference to a constant mass, the presence of a shock impulse caused by a percussive force of a predetermined minimum value;

detecting by integrating over a predetermined time period, the magnitude of the percussive force from a single shock impulse causing event; and generating said detection signal, indicative of an intrusion attempt, whenever the magnitude of the percussive force exceeds a predetermined minimum value over a predetermined time period.

* * * * *